United States Patent

Nihei et al.

[11] Patent Number: 6,136,459
[45] Date of Patent: Oct. 24, 2000

[54] NONMAGNETIC SUBSTRATE AND MAGNETIC HEAD USING THE SAME

[75] Inventors: Yukari Nihei; Takashi Tamura, both of Miyagi, Japan

[73] Assignee: Sony Corporation, Tokyo, Japan

[21] Appl. No.: 09/192,382

[22] Filed: Nov. 16, 1998

[30] Foreign Application Priority Data

Nov. 17, 1997 [JP] Japan ................................. 9-315614

[51] Int. Cl.$^7$ ....................................................... G11B 5/66
[52] U.S. Cl. .................................. 428/694 ST; 428/692; 428/900; 501/10; 501/69; 501/73; 360/126
[58] Field of Search ............................. 478/694 ST, 692, 478/900; 501/10, 69, 73; 360/126

[56] References Cited

U.S. PATENT DOCUMENTS

| 5,476,821 | 12/1995 | Beall | ........................................ 501/10 |
| 5,491,116 | 2/1996 | Beall | .......................................... 501/5 |
| 5,744,208 | 4/1998 | Beall | ...................................... 428/64.1 |

*Primary Examiner*—Leszek Kiliman
*Attorney, Agent, or Firm*—Hill & Simpson

[57] ABSTRACT

A nonmagnetic substrate includes NiO, $TiO_2$, ZnO, and CaO as major constituents, and major ilmenite and spinel structures, in which the percentage of the total area of the ilmenite and spinel crystalline domains occupied in the area of a given cross section of the nonmagnetic substrate is 20% or more. Preferably, the remainder of the area of the cross section, other than the ilmenite and spinel crystalline domain, contains a $CaTiO_3$ phase and a $TiO_2$ phase.

4 Claims, 1 Drawing Sheet

NONMAGNETIC SUBSTRATE AND MAGNETIC HEAD USING THE SAME

BACKGROUND OF THE INVENTION

1. Field of the Invention

The present invention relates to a nonmagnetic substrate and to a magnetic head using the same, and more specifically, relates to a nonmagnetic substrate having excellent abrasion resistance and processibility and to a magnetic head using the same.

2. Description of the Related Art

A magnetic recording and replaying system, such as a video tape recorder (VTR) or a digital audio tape (DAT), which uses a magnetic tape as a recording medium is provided with a magnetic head for recording and replaying the signal on the magnetic tape. Additionally, a magnetic recording and reproducing system such as a hard disk drive (HDD) or a floppy disk drive (FDD) which uses a magnetic disk as a recording medium is provided with a magnetic head.

Among magnetic heads, an electromagnetic-induction type is predominantly used, which includes a magnetic core formed of a high permeability material and a member such as a coil that is wound around the magnetic core. Generally, in the magnetic head of the electromagnetic-induction type, two core halves, cut by machining from a bulk high permeability material, have been joined together to fabricate the magnetic core. However, with the recent tendency toward high-density recording, a narrower track width and a narrower gap width have been required for the magnetic head of the electromagnetic induction type.

In order to meet the demands described above, use of thin-film magnetic heads has been implemented. The thin-film magnetic head is fabricated by depositing a magnetic thin film having high permeability and a conductive material thin film on a nonmagnetic substrate such as a ceramic, and using a thin-film processing technique such as dry etching to form a magnetic core or a magnetic coil. Additionally, multilayer magnetic heads have been put to practical use. The multilayer magnetic head is fabricated by depositing magnetic thin films and insulating films in multiple layers on a nonmagnetic substrate to form magnetic core halves and joining magnetic core halves together.

In contrast, although only for replaying, magneto-resistive heads in which a magneto-resistive element thin film is formed on a nonmagnetic substrate are used mainly for HDD systems.

Also, in the HDD system, a magnetic head is mounted on the end of a nonmagnetic substrate block called a slider in order to lift the magnetic head so as to be nearly in contact with a hard disk.

As the nonmagnetic substrate for the thin-film magnetic head, the multilayer magnetic head, or the slider, MnO—NiO-based double oxide has been known, for example, as disclosed in Japanese Patent Laid-Open No. 62-22411. The double oxide disclosed has an NaCl crystal structure containing MnO as a major constituent, enabling improvement in processibility.

The MnO—NiO two-component double oxide, however, does not always have sufficient abrasion resistance to a thin-film-deposited tape which has been developed particularly as a high-density recording medium, in comparison with a ferrite single crystal. Therefore, the thin-film magnetic head or multilayer magnetic head having the MnO—NiO two component double oxide as a nonmagnetic substrate or guard material has a shorter life in comparison with a bulk head or an MIG head having the ferrite single crystal as a magnetic core material. The problem is noticeable when it is used, for example, in a low-temperature, high-humidity environment.

SUMMARY OF THE INVENTION

The present invention solves the problems described above with respect to the conventional art.

It is an object of the present invention to provide a nonmagnetic substrate having excellent abrasion resistance and processibility and a magnetic head using the same.

A nonmagnetic substrate of the present invention is composed of NiO, $TiO_2$, ZnO, and CaO as major constituents and has ilmenite and spinel structures as major crystal structures. The percentage of the total area of the ilmenite crystalline domain and the spinel crystalline domain occupied in the area of a given cross section of the nonmagnetic substrate is 20% or more. The percentage of the total area of the ilmenite crystalline domain and the spinel crystalline domain does not have a particular upper limit and may be 100%.

In view of processibility of the nonmagnetic substrate, the remainder of the area of the cross section, other than the total area of the ilmenite crystalline domain and the spinel crystalline domain, preferably contains a $CaTiO_3$ phase and a $TiO_2$ phase.

A magnetic head of the present invention includes a magnetic thin film formed on a nonmagnetic substrate composed of NiO, $TiO_2$, ZnO, and CaO as major constituents and having major ilmenite and spinel structures. The percentage of the total area of the ilmenite and spinel crystalline domains occupied in the area of a given cross section of the nonmagnetic substrate is 20% or more. The percentage of the total area of the ilmenite and spinel crystalline domains also does not have a particular upper limit and may be 100%.

In accordance with the magnetic head of the present invention, in view of processibility, the remainder of the area of the cross section, other than the total area of the ilmenite and spinel crystalline domains, also preferably contains a $CaTiO_3$ phase and a $TiO_2$ phase.

The nonmagnetic substrate and the magnetic head using the same in accordance with the present invention may be applicable to any type of head such as a thin-film magnetic head or multilayer magnetic head, or may be applicable to any use such as in a head for applying magnetic bias or a slider for use in an electromagnetic induction type, magneto-resistive type, or magneto-optical recording medium.

In accordance with the nonmagnetic substrate of the present invention, by setting the percentage of the total area of the ilmenite and spinel crystalline domains at 20% or more, abrasion resistance that is equal to or greater than that obtained by a magnetic head using a ferrite core can be obtained when a magnetic recording medium such as a thin-film-deposited tape or a coated tape is used.

In addition, when the remainder of the area, other than the ilmenite and spinel crystalline domains, contains a $CaTiO_3$ phase having a perovskite crystal structure and a $TiO_2$ phase having a rutile crystal structure, the processibility during machining can be enhanced while maintaining abrasion resistance.

DESCRIPTION OF THE PREFERRED EMBODIMENTS

A nonmagnetic substrate and a magnetic head using the same in accordance with the present invention will be described with reference to FIGS. 1 and 2.

Figure 1:
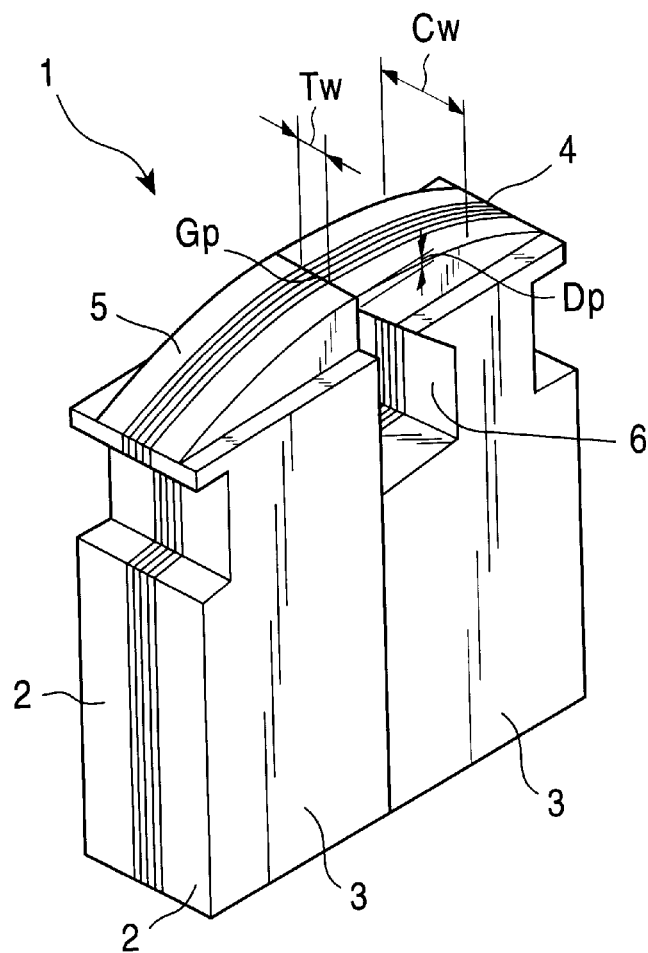
FIG. 1 is a schematic perspective view which shows an example of a multilayer magnetic head.

FIG. 1 is a schematic perspective view which shows an example of a multilayer magnetic head. A magnetic head 1 shown in FIG. 1 is fabricated by joining together a pair of magnetic core halves 3 in which a multilayer magnetic film 4 formed of high-permeability magnetic thin films and insulating films alternately deposited is sandwiched between nonmagnetic substrates 2. A magnetic gap Gp is formed in a sliding surface 5 facing a magnetic recording medium (not shown in the drawing). A track width Tw of the magnetic gap Gp is determined by the thickness of the multilayer magnetic film 4. Also, a contact width Cw of the sliding surface 5 with the magnetic recording medium is determined by the total thickness of the multilayer magnetic film 4 and the nonmagnetic substrates 2. An opening for winding 6 is formed on the joining face of one of the magnetic core halves 3 in order to control a gap depth Dp of the magnetic gap Gp and to wind up a coil (not shown in the drawing).

By applying the nonmagnetic substrate 2 in accordance with the present invention to such a multilayer magnetic head, a magnetic head having excellent abrasion resistance and processibility can be obtained.

Figure 2:
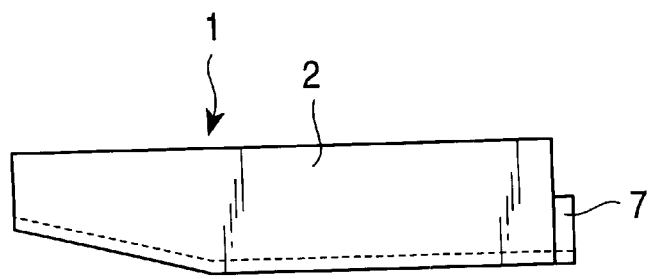
FIG. 2 is a schematic side view which shows an example of a magnetic head for a HDD.

FIG. 2 is a schematic side view which shows an example of a magnetic head for a HDD system. A magnetic head 1 in FIG. 2 includes a nonmagnetic substrate 2, which is a Winchester-type slider, and a magnetic head element 7 is affixed to an end of the nonmagnetic substrate 2. The magnetic head element 7 may be of an electromagnetic-induction type or a magneto-resistive type. The dashed line in the drawing represents a groove formed in the longitudinal direction of the sliding surface of the magnetic head 1.

By applying the nonmagnetic substrate 2 in accordance with the present invention to the magnetic head 1 for the HDD system shown in FIG. 2, a magnetic head having excellent abrasion resistance and processibility can be obtained.

The nonmagnetic substrate of the present invention can be produced by a conventional method.

That is, commercially available NiO powder, $TiO_2$ powder, ZnO powder, and $CaCO_3$ powder were weighed so that NiO, $TiO_2$, ZnO, and CaO were at predetermined proportions, and were mixed, with pure water being added, for 24 hours in a ball mill. Next, the slurry was taken out of the ball mill, and drying treatment was performed at 100° C. for 20 hours or more. The resultant dry cake was roughly pulverized, and then was preliminarily burned at 1,100° C. for 5 hours. Pure water was added again to the powder obtained by pulverizing the preliminarily burnt sinter, and mixing was performed in a ball mill for 24 hours. After drying at 100° C. for 20 hours or more, the resultant dry cake was further pulverized, and 10 weight % aqueous polyvinyl alcohol (PVA) solution was added at 10 weight % of the dry cake for granulation.

Press forming was performed at 80 MPa, and burning was performed in an oxygen atmosphere in a temperature range of 1,250° C. to 1,400° C. Then, hot isotropic press (HIP) treatment was performed in a temperature range of 1,150° C. to 1,350° C. while pressurizing at 100 MPa by argon gas to form a nonmagnetic substrate of the present invention.

With respect to the resultant nonmagnetic substrate, the total areal percentage of ilmenite and spinel crystalline domains, the crystal structure in the remainder, abrasion loss, and processibility were evaluated.

Evaluation of Total Areal Percentage of Ilmenite and Spinel Crystalline Domains, and Crystal Structure in the Remainder The nonmagnetic substrate was cut at a specific cross section, the cross section was subjected to mirror polishing, and thermal etching was performed at 1,100° C. for 3 hours. The crystal structures of the individual crystalline domains exposed on the cross section were identified by an X-ray micro analyzer (XMA). The areal percentage of each crystal structure was obtained by an image analysis system.

Of course, the areal percentage of each crystal structure may be calculated based upon the molar ratio of NiO, $TiO_2$, ZnO, and CaO in the raw material and the molar ratio, molecular weight, and specific gravity of $CaTiO_3$, $NiZnTiO_3$, $Zn_2TiO_4$, $NiTiO_3$, $TiO_2$, and NiO which constitute the nonmagnetic substrate obtained.

Evaluation of Abrasion Loss

The abrasion loss of the nonmagnetic substrate was measured by forming a dummy head for a VTR with a nonmagnetic substrate alone. The dimensions of the dummy head were 2 mm (width)×2 mm (height)×0.2 mm (thickness). The contact width of the sliding surface was 80 μm, and the curvature R in the contact width direction was 6 mm.

The abrasion test was performed by mounting the dummy head on a data storage tape drive deck SDX-300C (manufactured by Sony Corporation). After driving a thin-film-deposited tape SDX-T3N (manufactured by Sony Corporation) composed of a Co-based alloy for 1,000 hours at 5° C. and 50% RH, the change in protrusion of the dummy head from the drum was measured to determine the abrasion loss. Of course, the smaller the abrasion loss, the better the abrasion resistance. The protrusion of the dummy head from the drum was initially set at 30 μm.

Evaluation of Processibility

By using a general slicing machine, the abrasion loss of a grinding wheel after the nonmagnetic substrate was subjected to 50 passes of the grinding wheel, that is, the difference between the initial depth of the groove and the depth of the groove formed onto the grinding wheel after 50 passes, was measured to evaluate the processibility. The smaller the abrasion loss of the grinding wheel, the better the processibility. The processibility was evaluated under the following conditions; grinding wheel: SD3/8 (R200), number of revolutions of the grinding wheel. 5,000 rpm, feed speed: 30 mm/min., and groove depth: 0.1 mm.

With respect to the abrasion loss and processibility, evaluations were also made for a ferrite single crystal and an MnO—NiO-based nonmagnetic substrate as comparative materials.

Production of Nonmagnetic Substrate Samples

The sample Nos. 1 to 19 shown in Table 1 were produced by changing the composition of NiO, $TiO_2$, ZnO, and CaO in the raw material.

TABLE 1

| No. | Composition (mol %) | | | |
| --- | --- | --- | --- | --- |
| | NiO | $TiO_2$ | ZnO | CaO |
| 1 | 1 | 80 | 1 | 18 |
| 2 | 1 | 80 | 2 | 17 |

TABLE 1-continued

| No. | Composition (mol %) | | | |
|---|---|---|---|---|
| | NiO | TiO$_2$ | ZnO | CaO |
| 3 | 2 | 80 | 1 | 17 |
| 4 | 2 | 80 | 3 | 15 |
| 5 | 3 | 60 | 2 | 35 |
| 6 | 5 | 60 | 4 | 31 |
| 7 | 5 | 60 | 6 | 29 |
| 8 | 10 | 60 | 10 | 20 |
| 9 | 60 | 20 | 10 | 10 |
| 10 | 14 | 60 | 10 | 16 |
| 11 | 43 | 30 | 10 | 17 |
| 12 | 40 | 30 | 15 | 15 |
| 13 | 20 | 55 | 20 | 5 |
| 14 | 50 | 30 | 10 | 10 |
| 15 | 23 | 50 | 10 | 17 |
| 16 | 45 | 36 | 10 | 9 |
| 17 | 28 | 50 | 10 | 12 |
| 18 | 32 | 34 | 32 | 2 |
| 19 | 33.3 | 33.3 | 33.3 | 0 |
| Comparative material 1 | Ferrite Single Crystal | | | |
| Comparative material 2 | MnO-NiO-based | | | |

With respect to the nonmagnetic substrates of the sample Nos. 1 to 19, the percentage of the total area of the ilmenite and spinel crystalline domains, and the crystal structure in the remainder, were evaluated.

Also, with respect to the nonmagnetic substrates of the sample Nos. 1 to 19 and the nonmagnetic substrates of the comparative materials, the abrasion loss and the processibility (abrasion loss of grinding wheel) were evaluated.

The evaluation results are shown in Table 2.

TABLE 2

| No. | Percentage of Ilmenite and Spinel Structures (areal %) | Crystal Structure in the Remainder | Abrasion Loss ($\mu$m) | Abrasion Loss of Grinding Wheel ($\mu$m) |
|---|---|---|---|---|
| 1 | 7 | CaTiO$_3$, TiO2 | 5 | 1 |
| 2 | 10 | CaTiO$_3$, TiO$_2$ | 3 | 2 |
| 3 | 11 | CaTiO$_3$, TiO$_2$ | 3 | 2 |
| 4 | 14 | CaTiO$_3$, TiO$_2$ | 2 | 2 |
| 5 | 15 | CaTiO$_3$, TiO$_2$ | 2 | 3 |
| 6 | 20 | CaTiO$_3$, TiO$_2$ | 1 | 3 |
| 7 | 22 | CaTiO$_3$, TiO$_2$ | 1 | 3 |
| 8 | 29 | CaTiO$_3$, TiO$_2$ | 0.8 | 4 |
| 9 | 36 | CaTiO$_3$, NiO | 0.8 | 18 |
| 10 | 41 | CaTiO$_3$, TiO$_2$ | 0.8 | 4 |
| 11 | 45 | CaTiO$_3$, NiO | 0.8 | 20 |
| 12 | 47 | CaTiO$_3$, NiO | 0.8 | 20 |
| 13 | 49 | CaTiO$_3$, TiO$_2$ | 0.8 | 4 |
| 14 | 55 | CaTiO$_3$, NiO | 0.5 | 20 |
| 15 | 62 | CaTiO$_3$ | 0.6 | 4 |
| 16 | 65 | CaTiO$_3$, NiO | 0.6 | 22 |
| 17 | 70 | CaTiO$_3$ | 0.5 | 5 |
| 18 | 89 | CaTiO$_3$ | 0.5 | 5 |
| 19 | 100 | — | 0.5 | 5 |
| Comparative material 1 | — | — | 1 | 1 |
| Comparative material 2 | — | — | 20 | 20 |

The results in Table 2 will be discussed.

With respect to the samples Nos. 1 to 5, which have a percentage of the total area of ilmenite and spinel crystalline domains of less than 20%, the abrasion loss is larger than that of the comparative material 1 that is a ferrite single crystal, all being 2 $\mu$m or more. Therefore, if any one of the samples Nos. 1 to 5 is used for a guard material, slider, or the like in a magnetic head, large abrasion loss will shorten the life of a magnetic head, which is undesirable.

In contrast, with respect to the samples Nos. 6 to 19, which have a percentage of the total area of ilmenite and spinel crystalline domains of 20% or more, the abrasion loss is equal to or less than that of the comparative material 1 that is a ferrite single crystal, all being 1 $\mu$m or less. Therefore, if any one of the samples Nos. 6 to 19 is used for a guard material, slider, or the like in a magnetic head, a magnetic head having a small abrasion loss and a long life can be fabricated.

Among the samples Nos. 6 to 19, the samples Nos. 6, 7, 8, 10, 13, 15, 17, 18, and 19, which contain a CaTiO$_3$ phase and a TiO$_2$ phase in the remainder of the crystal structure, other than the ilmenite and spinel crystalline domains, have a small abrasion loss of 3 to 5 $\mu$m and good processibility.

However, among the samples Nos. 6 to 19, the samples Nos. 9, 11, 12, 14, and 16, which contain NiO (NaCl crystal structure) in the remainder of the crystal structure, other than the ilmenite and spinel crystalline domains, have a large abrasion loss of 18 to 22 $\mu$m and unsatisfactory processibility, the same as the MnO—NiO-based comparative material 2.

From the evaluation results and the examination described above, it has been found that the nonmagnetic substrate, which contains NiO, TiO$_2$, ZnO, and CaO as major constituents and ilmenite and spinel structures as major crystal structures, and which has an areal percentage of the total area of ilmenite and spinel crystalline domains of 20% or more, has a small abrasion loss that is equal to or lower than that of a ferrite single crystal.

Also, when the remainder of the crystal structure, other than the ilmenite and spinel crystalline domains, contains a CaTiO$_3$ phase and a TiO$_2$ phase, the processibility can also be improved.

Although the test was performed assuming a nonmagnetic substrate for a magnetic head for use in a data storage tape recorder in the embodiments described above, similar results may be obtained for a magnetic head for a VTR or a DAT, a slider for a HDD, or the like.

As described above, from a nonmagnetic substrate in accordance with the present invention, good abrasion resistance which is equal to or greater than that of a magnetic core material of a ferrite single crystal can be obtained.

Also, when the remaining area, other than the total area of the ilmenite and spinel crystalline regions, contains a CaTiO$_3$ phase and a TiO$_2$ phase, processibility can also be improved.

Therefore, by employing such a nonmagnetic substrate, a magnetic head or a slider which has excellent abrasion resistance and long life can be fabricated.

What is claimed is:

1. A nonmagnetic substrate having ilmenite and spinel structures comprising NiO, TiO$_2$, ZnO, and CaO,
   wherein, the substrate is 100% crystalline, the percentage of the total area of the ilmenite crystalline domain and the spinel crystalline domain occupying an area of a given cross section of said nonmagnetic substrate is 20% or more, and a remainder comprises perovskite structures.

2. A nonmagnetic substrate according to claim 1, wherein the remainder of said area of the cross section, other than said ilmenite crystalline domain and said spinel crystalline domain, contains a CaTiO$_3$ phase and a TiO$_2$ phase.

3. A magnetic head comprising a magnetic thin film formed on a nonmagnetic substrate having ilmenite and spinel structures comprising NiO, TiO$_2$, ZnO, and CaO, wherein, the substrate is 100% crystalline, the percentage of the total area of the ilmenite crystalline domain and the spinel crystalline domain occupying an area of a given cross section of said nonmagnetic substrate is 20% or more, and a remainder comprises perovskite structures.

4. A magnetic head according to claim 3, wherein the remainder of said area of the cross section, other than said ilmenite crystalline domain and said spinel crystalline domain, contains a $CaTiO_3$ phase and a $TiO_2$ phase.

* * * * *